July 19, 1966
D. E. KROPP ETAL
3,261,626
APPARATUS FOR ATTACHING PARTS TO GLASS COATED APPARATUS
Filed March 25, 1964
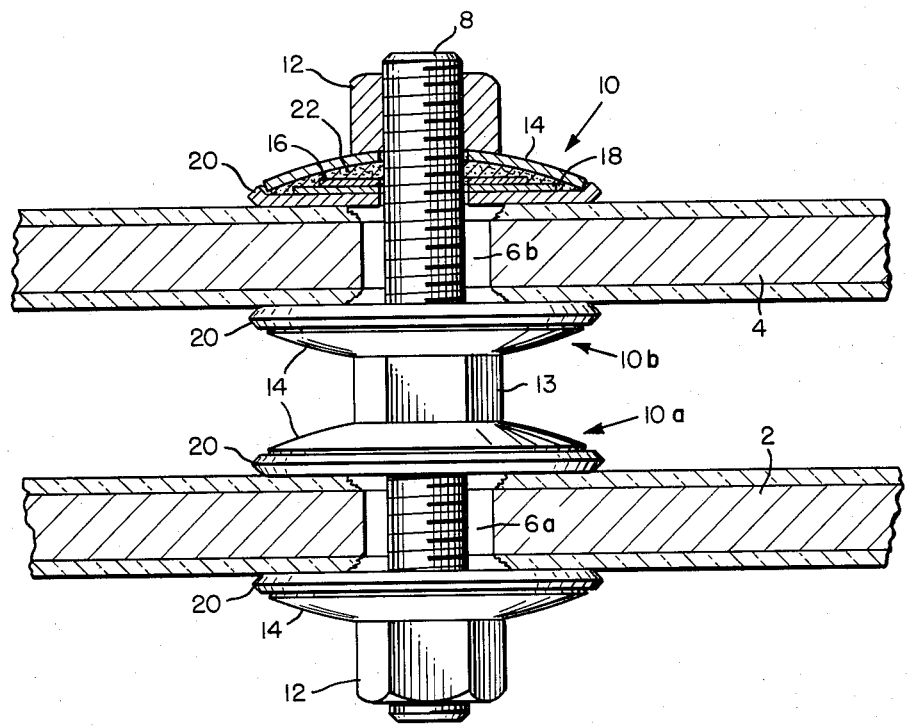
INVENTORS.
DONALD E. KROPP
ALBERT M. AGRON
BY *Theodore P Roessel*
ATTORNEY

United States Patent Office 3,261,626
Patented July 19, 1966

3,261,626
APPARATUS FOR ATTACHING PARTS TO GLASS COATED APPARATUS
Donald E. Kropp and Albert M. Agron, Elyria, Ohio, assignors to Pfaudler Permutit Inc., Rochester, N.Y., a corporation of New York
Filed Mar. 25, 1964, Ser. No. 354,570
3 Claims. (Cl. 287—189.36)

This invention relates to a glass or vitreous enamel-coated apparatus, such as containers for holding or processing corrosive liquids, and in particular relates to apparatus for mounting glass coated internals therein.

It is often desirable to incorporate within a reactor vessel, various devices such as hangers, brackets, trays etc. which devices are commonly called "internals." However, to provide flexibility and to expedite the manufacture changing or replacement of these internally positioned devices it is preferable that they be mounted impermanently rather than permanently. Therefore, it is common practice to include within a vessel a support member adapted for receipt and removal of these so-called "internals."

In applications where corrosion resistance, in general, and acid or alkali resistance in particular, are of paramount concern, the processing equipment is frequently protected by coating a structural base metal with a corrosion resisting glass or viterous enamel. In many instances, it is desirable that the support members and internals for use in such systems should also be glass coated. However, it is extremely difficult to install the internals in a manner that will not expose some portion of the base metal to the corrosive materials within the reactor. Accordingly, the primary object of this invention is to provide apparatus for attaching glass coated internals to glass coated members so as not to expose the base metal to the product within the reactor vessel.

In drilling holes through a glassed metal member, chipping occurs at the periphery of the hole. Since this chipping of the glass coat exposes portions of the base metal, it is necessary to insulate this portion of the member from any contact with the corrosive medium. It is, therefore, another object of this invention to provide apparatus that will seal the portion of the surface metal that has been chipped, thus protecting it from the corrosive media.

Many of the members either supporting or attached have surfaces that are not completely planar; accordingly, it is another object of this invention to provide a flexible sealing means adapted for use on the irregular or wavy surfaces that are common in glass coated articles.

Since the portion of the member immediately adjacent to the holes will be somewhat weakened by the drilling operation, it is another object of this invention to provide a fastening device designed so that the force exerted will be concentrated at a point that is not immediately adjacent the hole.

The accompanying drawing illustrates an embodiment of apparatus according to my invention.

In the drawing:

The figure is a fragmentary elevational view, partly in section, of two glass coated metal members joined according to this invention.

The single figure shows a glass coated member 2 that is to be attached to a glass coated support member 4. In accordance with my invention, holes 6a and 6b, adapted for receiving a rod of suitable diameter, are drilled through members 2 and 4 respectively. In the described embodiment threaded stud 8 is passed through holes 6a and 6b and also through fastener assemblies 10, hereinafter more fully described, located on each side of members 2 and 4. Nuts 12 located at the ends of stud 8 and nut 13 located intermediate its ends and separating adjacent fastener assemblies 10a and 10b, serve to secure the entire assembly.

Fastener assembly 10 consists of a dished disc 14 having a passage centrally located therein for the receipt of stud member 8, intermediate gaskets 16 and 18 and base gasket 20. Gasket 20 which is made of a flexible corrosion resisting material such as "Teflon," is slightly larger in diameter than disc 14 and is located at the surface of the members to be joined. Intermediate gaskets 16, 18 are of a smaller diameter than that of disc 14 and are placed between base gasket 20 and disc 14. Disc 14 is positioned over the intermediate gaskets with its concave underside disposed toward the base gasket 20 and with its perimeter contacting gasket 20. Prior to placing disc 14 in place the interior of the fastener assembly is filled with a cement 22 such as the commercially available "Alkor," "Penchlor" or an epoxy resin.

To effect the joining of members 2 and 4, assemblies 10 are disposed on either side of the members. Nuts 12 and 13 are positioned in contact with the outer or convex side of disc 14 and threaded stud 8 is passed through the entire assembly. As the appropriate nuts are tightened, pressure is exerted upon the outside surface of disc 14 and transmitted through its outside edges to base gasket 20 thus pressing it into a spring-loaded sealing engagement with the glass surface of the respective members 2 and 4. This also has the effect of avoiding the exertion of force at the periphery of the drilled holes.

The sealing engagement of base gasket 20 with the glass surface prevents leakage of the corrosive medium within the container into contact with the surfaces of the base metal exposed by the drilling of passages 6a and 6b. To further assure integrity of the base metal and to seal the area around stud 8, the cement 22 and intermediate gaskets 16, 18, fill the interior of disc 14 and further resist any leakage.

The apparatus involved in this invention falls into two classes. The first class includes the stud 8, discs 14, and nuts 12, 13. These should be fabricated from corrosion resistant metals governed by the particular medium to which they will be exposed. Suitable metals include columbium, molybdenum, zirconium, tantalum, palladium, platinum, "Hastelloy" stainless steel, etc. Tantalum is advantageous for most applications because of moderate cost and good corrosion resistance.

The second class of apparatus materials involved includes the base gasket 20 and intermediate gaskets 16, 18. These parts should exhibit corrosion resistance, flexibility and resilience. We have found "Teflon," "Neoprene," and "Tygon" to be suitable for this application. The number of intermediate gaskets and the material from which they are made may be varied to suit the requirements of the particular application.

The cement used is generally selected from available silicate and furan resins. The silicate is preferred where strongly oxidizing media are involved e.g. nitric acid. The furan type is preferred where alkaline media are involved or where the environment is aqueous or neutral. Although the disclosed embodiment includes cement, a fastener assembly without the cement is useful in applications where conditions are not highly corrosive. Various modifications that are within the scope of this invention include the threading of passages 6a and 6b and the adaptation of fastener assembly 10 to conform to the surface configuration of the particular member to be secured.

Although the invention has been illustrated by a particular preferred embodiment, it is to be understood that such disclosure is intended to be illustrative, not limiting, and that various modifications that will become apparent to those skilled in the art are within the scope of this invention and the appended claims.

We claim:
1. A device for releasably connecting vitreous enamel coated members in spaced relationship, said device comprising:
   (a) a stud adapted to extend through aligned holes in said members;
   (b) a plurality of fastener assemblies each comprising a resilient dished disc having inwardly oriented edges and a central opening to receive said stud, a gasket adapted for disposition between said inwardly oriented edges and the vitreous enamel coating of said members and a corrosion resistant plastic cement within said dished disc, said cement setting about said stud to prevent leakage through said aligned holes, and said cement joining said dished disc and said gasket; and
   (c) locking means adapted to cooperate with said stud to draw said members together for forcing each disc toward an associated member to seal said gasket resiliently between said inwardly oriented edges and the vitreous enamel coating of said associated member.

2. A device for releasably joining vitreous enamel coated members in spaced apart relationship, said device comprising:
   (a) a stud adapted to extend through aligned holes in said members;
   (b) an intermediate separating means disposed between said members and about said stud and sealed against the vitreous enamel coating of said members for maintaining said members in spaced apart relationship;
   (c) a resilient, dished disc having a central opening therethrough to receive said stud having an inwardly oriented peripheral edge;
   (d) a gasket adapted for disposition between said inwardly oriented edge and said vitreous coating, said gasket meeting said inwardly oriented peripheral edge to form an annular space between said disc and said gasket and about said stud;
   (e) a plastic cement filling said space wherein said gasket prevents said plastic from contacting and bonding to said vitreous enamel coatings; and
   (f) means cooperating with said stud for drawing said members together against said intermediate separating means.

3. A device as set forth in claim 2 in which said intermediate separating means comprises:
   (a) a pair of said dish discs in back to back relationship, said means being interposed between said discs; and
   (b) a pair of said gaskets each interposed between said inwardly oriented edges and said vitreous coating.

References Cited by the Examiner
UNITED STATES PATENTS

| 2,097,713 | 11/1937 | Ashley | 189—36 |
| 2,631,360 | 3/1953 | Sanford et al. | 189—36 X |
| 2,884,100 | 4/1959 | McKee | 85—1 |
| 2,927,495 | 3/1960 | Barwood | 189—36 X |

HARRISON R. MOSELEY, *Primary Examiner.*

FRANK L. ABBOTT, *Examiner.*

L. R. RADANOVIC, J. K. BELL, *Assistant Examiners.*